(12) United States Patent
Jo et al.

(10) Patent No.: US 7,450,166 B2
(45) Date of Patent: Nov. 11, 2008

(54) DIGITAL SIGNAL PROCESSING APPARATUS IN IMAGE SENSOR

(75) Inventors: Young-Mi Jo, Chungcheongbuk-do (KR); Chae-Sung Kim, Chungcheongbuk-do (KR)

(73) Assignee: Magnachip Semiconductor, Ltd. (KR)

( * ) Notice: Subject to any disclaimer, the term of this patent is extended or adjusted under 35 U.S.C. 154(b) by 614 days.

(21) Appl. No.: 11/082,472

(22) Filed: Mar. 16, 2005

(65) Prior Publication Data

US 2005/0238225 A1 Oct. 27, 2005

(30) Foreign Application Priority Data

Apr. 21, 2004 (KR) .................... 10-2004-0027509

(51) Int. Cl.
| H04N 9/64 | (2006.01) |
| H04N 5/217 | (2006.01) |
| H04N 5/208 | (2006.01) |
| H04N 3/14 | (2006.01) |
| G06K 9/00 | (2006.01) |
| G06K 9/40 | (2006.01) |
| G06K 9/60 | (2006.01) |

(52) U.S. Cl. .................... 348/242; 348/222.1; 348/241; 348/252; 348/253; 348/280; 382/162; 382/167; 382/266; 382/300

(58) Field of Classification Search ........................ None
See application file for complete search history.

(56) References Cited

U.S. PATENT DOCUMENTS 5,457,477 A * 10/1995 Wang et al. .................. 345/589
6,628,330 B1 * 9/2003 Lin ............................. 348/252
6,642,962 B1 * 11/2003 Lin et al. ..................... 348/252
6,697,110 B1 * 2/2004 Jaspers et al. ............... 348/272
6,816,193 B1 * 11/2004 Kohashi et al. ............. 348/234
7,139,022 B1 * 11/2006 Raffy ......................... 348/273
7,200,279 B1 * 4/2007 Lin ............................. 382/274
7,301,573 B2 * 11/2007 Park et al. ................... 348/252

FOREIGN PATENT DOCUMENTS

KR 2003-0023294 3/2003

* cited by examiner

*Primary Examiner*—David Ometz
*Assistant Examiner*—Wanda M Negron
(74) *Attorney, Agent, or Firm*—Blakely, Sokoloff, Taylor & Zafman

(57) ABSTRACT

Disclosed is an apparatus for processing a digital signal in an image sensor. The apparatus includes: a line memory unit for storing an inputted digital signal of red (R), green (G) and blue (B); a kernel generation unit for generating a plurality of kernels after receiving the RGB digital signal from the line memory unit; a false color detection unit for detecting false colors by using the plurality of kernels; an edge detection unit for detecting edges by using the plurality of kernels; an interpolation unit for interpolating the RGB digital signal from the line memory unit; a color space conversion unit for converting the interpolated RGB digital signal into a YCbCr signal; and an image enhancement unit for suppressing the false colors and enhancing the edges in the YCbCr signal in response to outputs of the false color detection unit and the edge detection unit.

6 Claims, 2 Drawing Sheets

DIGITAL SIGNAL PROCESSING APPARATUS IN IMAGE SENSOR

FIELD OF THE INVENTION

The present invention relates to an image sensor; and more particularly, to a CMOS image sensor capable of providing an edge enhancement effect and a false color suppression effect with minimally using a memory.

DESCRIPTION OF RELATED ARTS

An image sensor is a device that reproduces images by using a property of semiconductors being reactive to light. That is, the image sensor detects brightness and a wavelength of each different light emitted from individual objects and subsequently reads the detected brightness and wavelength into an electrical value. Particularly, it is a role of the image sensor to convert the electrical value into a signal level that can be processed.

That is, the image sensor is a semiconductor device that converts an optical image into an electrical signal. Among various types of image sensors, a charge coupled device (CCD) is a device in which charge carriers are stored into and transferred to metal oxide semiconductor (MOS) capacitors closely allocated with each other. A complementary metal oxide semiconductor (CMOS) image sensor adopts a switching mode that detects outputs sequentially with use of MOS transistors prepared as many as pixels by employing CMOS technology in which a control circuit and a signal processing circuit are used as a peripheral circuit. Because of low power consumption, the CMOS image sensor can be widely applied to personal portable systems such as cellular phones, cameras for use in personal computers and medical fields and the like.

Therefore, designing of the CMOS image sensor should be more focused to minimize an area than to improve operation speed. However, since a memory occupies wide areas and dissipates large amounts of power, the use of such memory should be avoided.

FIG. 1 is a block diagram showing various configuration elements responsible for digital operation in a conventional image sensor.

As shown, the conventional image sensor includes: a first line memory unit 10; a RGB kernel generation unit 11; an interpolation unit 12; a color space conversion unit 13; a second line memory unit 14; an YCbCr kernel generation unit 15; and an image enhancement block 16.

The first line memory unit 10 receives red (R), green (G) and blue (B) digital signal and stores the received RGB digital signal in a line unit. Then, the RGB kernel generation unit 11 receives the RGB digital signal provided from the first line memory unit 10 and generates a kernel in a Bayer pattern, i.e., G-R-G-B pattern. The interpolation unit 12 interpolates each pixel into a corresponding RGB value by using the kernel provided from the RGB kernel generation unit 11.

Afterwards, the color space conversion unit 13 converts the interpolated RGB digital signal into the coordinates of the YCbCr color space. Herein, Y is a coordinate expressing brightness, and Cb and Cr are coordinates expressing saturation. The second line memory unit 14 receives the signals converted into the color space of YCbCr and stores the converted signals in a line unit.

Next, the YCbCr kernel generation unit 15 generates a kernel by using the YCbCr signal provided from the second line memory unit 14. The image enhancement block 16 improves an image quality by finding edges and false colors within the kernel generated by the YCbCr kernel generation unit 15 and enhancing the edges and suppressing the false colors. Especially, the image enhancement block 16 includes: an edge enhancement unit 161 for finding edges and increasing/decreasing the Y value at the edges to enhance the edge portions; and a false color suppression unit 162 for finding false colors and suppressing the false colors.

The RGB digital signal inputted to the first line memory unit 10 is a signal outputted as an analog signal outputted from a pixel array unit (not shown) passes through an analog signal processing unit including a decoder, an analog bus, a variable amplifier, an analog-to-digital converter and so on.

As depicted in FIG. 1, the conventional image sensor needs each two additional memories and kernel generation units for the color interpolation, the false color suppression and the edge enhancement. Since the first line memory unit 10 and the second line memory unit 14 should store signals in different formats, i.e., one in RGB and the other in YCbCr, a problem related to integration may occur.

Meanwhile, if the first line memory unit 10 and the second line memory unit 14 are grouped to be used in one unit and, the RGB kernel generation unit 11 and the YCbCr generation unit 15 are grouped to be used in one unit, there is a limitation in algorithm during operation for suppressing false colors and enhancing edges.

SUMMARY OF THE INVENTION

It is, therefore, an object of the present invention to provide an apparatus for processing digital signals in an image sensor capable of overcoming a limitation in algorithm and an integration problem caused by multiply employed memories during digital signal processing of the image sensor.

In accordance with an aspect of the present invention, there is provided an apparatus for processing a digital signal in an image sensor, including: a line memory unit for storing an inputted digital signal of red (R), green (G) and blue (B); a kernel generation unit for generating a plurality of kernels after receiving the RGB digital signal from the line memory unit; a false color detection unit for detecting false colors by using the plurality of kernels; an edge detection unit for detecting edges by using the plurality of kernels; an interpolation unit for interpolating the RGB digital signal from the line memory unit; a color space conversion unit for converting the interpolated RGB digital signal into a YCbCr signal; and an image enhancement unit for suppressing the false colors and enhancing the edges in the YCbCr signal in response to outputs of the false color detection unit and the edge detection unit.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

A digital signal processing apparatus in an image sensor in accordance with a preferred embodiment of the present invention will be described in detail with reference to the accompanying drawings.

Figure 2:
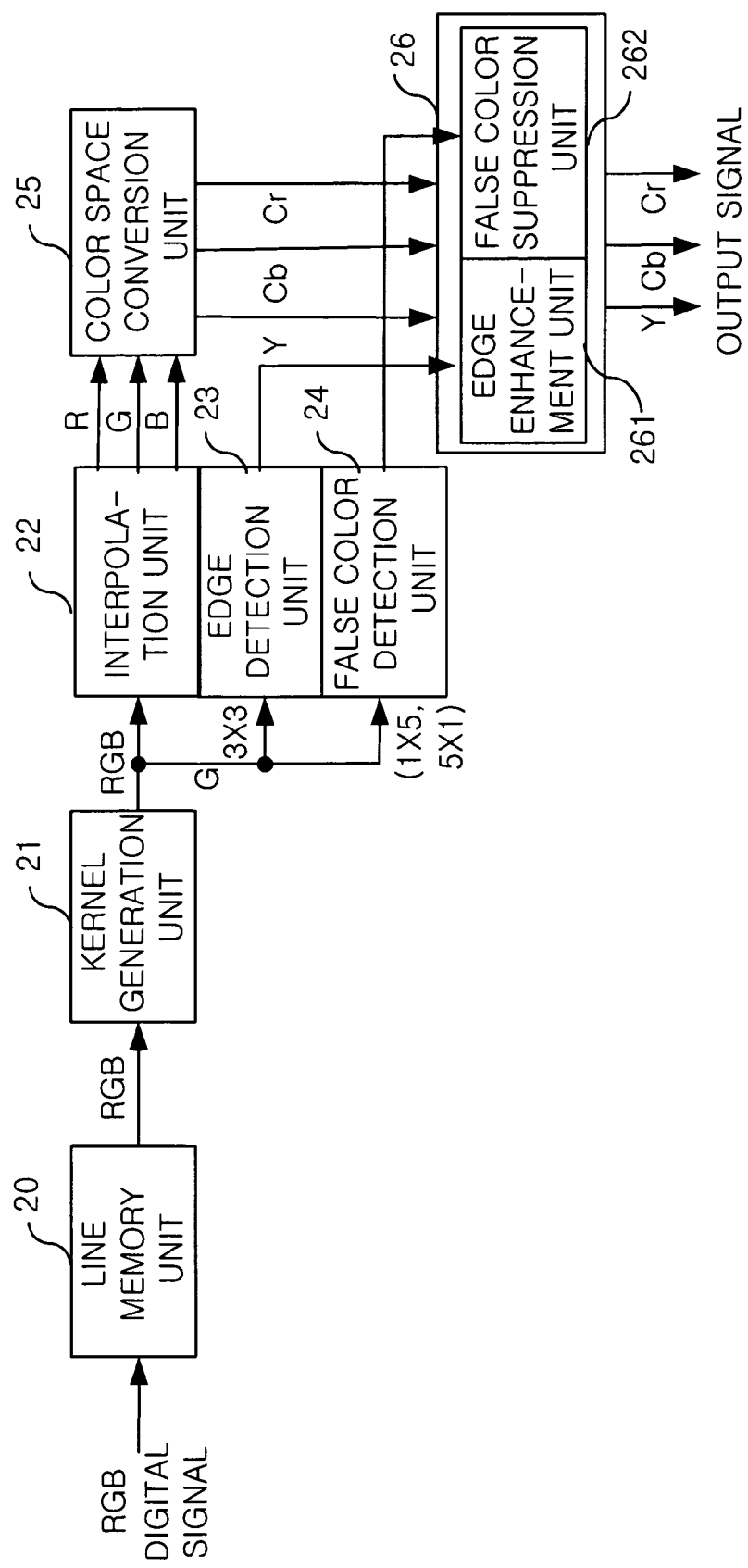
FIG. 2 is a block diagram showing an image sensor in accordance with a preferred embodiment of the present invention.

FIG. 2 is a block diagram showing an image sensor in accordance with the preferred embodiment of the present invention.

As shown, the image sensor includes: a line memory unit 20 for receiving a digital signal of red (R), green (G) and blue (B) and storing the RGB digital signal in a line unit; a kernel generation unit 21 for generating a plurality of RGB kernels after receiving the RGB signal from the line memory unit 20; an edge detection unit 23 for detecting edges by using the plurality of RGB kernels; a false color detection unit 24 for detecting false colors by using the plurality of RGB kernels; an interpolation unit 22 for interpolating the received RGB signal from the line memory unit 20; a color space conversion unit 25 for converting the interpolated RGB signal into a YCbCr signal in the YCbCr color space; and an image enhancement block 26 for suppressing false colors and enhancing edges in the YCbCr signal in response to outputs of the edge detection unit 23 and the false color detection unit 24. Herein, Y is the coordinate of the YCbCr color space, representing brightness while Cb and Cr are the coordinates of the YCbCr color space, representing saturation.

The edge detection unit 23 and the false color detection unit 24 use information on colors from the kernel generation unit 21 through the use of the RGB digital signal.

The image enhancement block 26 includes: an edge enhancement unit 261 for enhancing edge portions by increasing/decreasing a Y value at the edge portions of a corresponding pixel in response to an output of the edge detection unit 23; and a false color suppression unit 262 for suppressing a false color at a pixel having the false color in response to an output of the false color detection unit 24.

The RGB signal inputted to the line memory unit 20 is a signal outputted as an analog signal outputted from a pixel array unit (not shown) passes through an analog signal processing unit including a decoder, an analog bus, a variable amplifier, an analog-to-digital converter and so on.

During the generation of the RGB kernels, the R value and the B value among the corresponding pixel values are converted into the G value, being expressed as G color. The reason for converting the R and B values into the G value is because the G color component contains two times more amounts of image information than the R and B color components and is closely related to brightness expressing an overall silhouette of an image.

Also, the kernel for detecting false color and the kernel for detecting edges are partially shared. The kernel for detecting the false colors has a pixel array of 3×3 while the kernel for detecting the edges has a pixel array of 1×5 or 5×1. Also, the edge detection, the false color detection and the interpolation operation are carried out simultaneously.

Hereinafter, operation of the image sensor with the above provided configuration will be described in detail.

Prior to the edge enhancement operation and the false color suppression operation, it is important to discover a boundary line part and a false color part. Thus, the line memory unit 20 for storing peripheral pixels is required since the execution of the above two operations is determined based on information on peripheral pixels and currently focused pixels.

Figure 1:
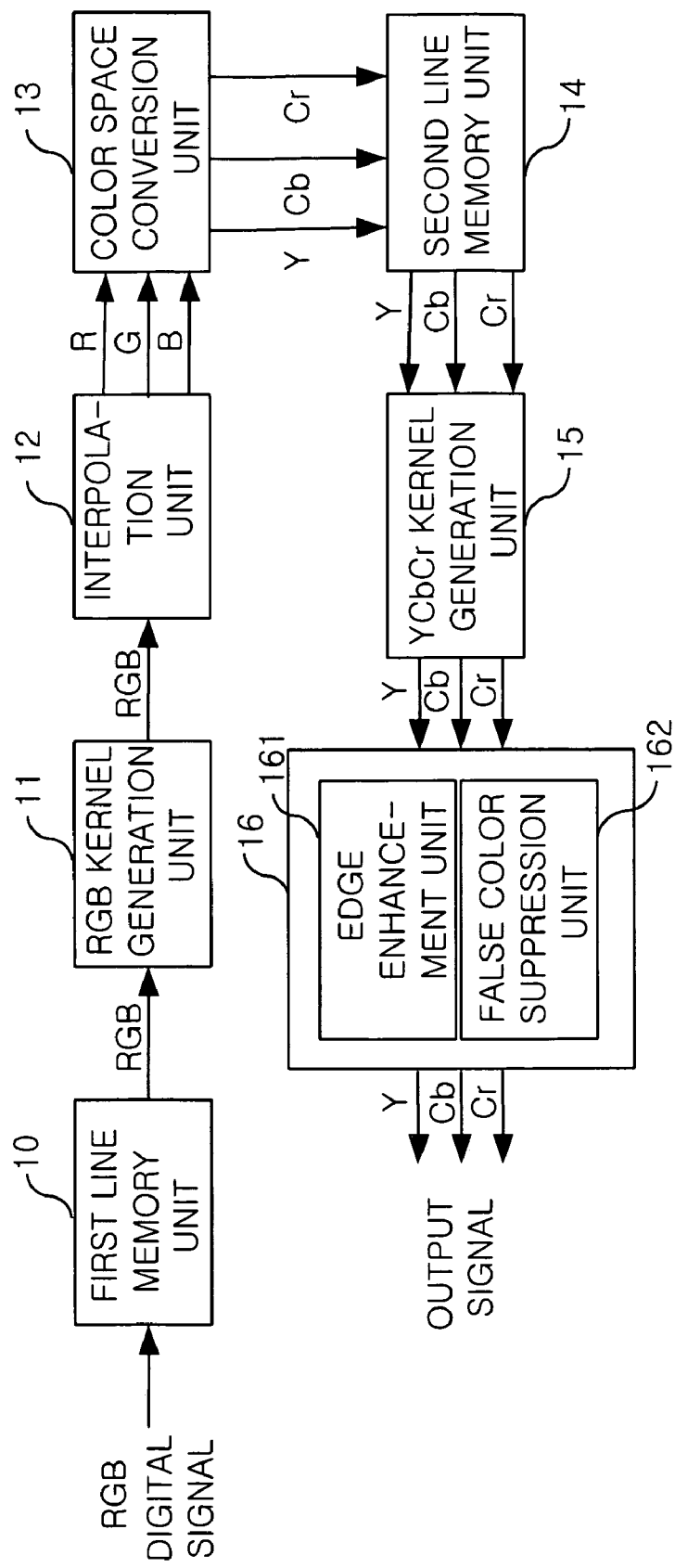
FIG. 1 is a block diagram showing configuration elements responsible for digital operation of a conventional image sensor.

As described in FIG. 1, the conventional image sensor requires separately including the first line memory unit 10 ahead of the interpolation unit 12 and the second line memory unit 14 for the edge enhancement operation and the false color suppression operation after the color space conversion 13.

In contrast, in the preferred embodiment of the present invention, since the false colors and edges are detected through using the line memory unit 20 for the color interpolation, the kernel generation unit 21 is used to generate the kernels for detecting false colors and edges.

For the edge detection, a Laplacian or Sobel mask is generally used. Also, it is necessary to employ a 3×3 kernel for the edge detection and a 5×1 or 1×5 kernel for the false color detection. Since these kernels have shared portions, it is possible to share hardware for generating the kernels. During the generation of the kernels, the R and B values are replaced with the G value by using peripheral G pixels.

In more detail of the replacement with the G value, the G value is an average value of 4 G pixels allocated around R and B pixels or an average value of two G pixels in a horizontal direction or in a vertical direction.

The edge enhancement changes the coordinate Y for brightness, while the false color suppression changes the coordinates of Cb and Cr for saturation. Thus, the edge enhancement and the false color suppression are carried out with using values based on the YCbCr color space. Hence, the edge detection and the false color detection are simultaneously carried out with the color interpolation and, are synchronized with the false color suppression operation and the edge enhancement operation thereafter. The edge enhancement and the false color suppression can also be carried out by employing the generally applied schemes.

In accordance with the preferred embodiment of the present invention, the line memory unit used for the color interpolation is shared for the edge detection and the false color detection. Therefore, unlike the conventional image sensor, an additional line memory unit is not required, thereby securing sufficient resources for algorithm and improving a scale of integration.

The present application contains subject matter related to the Korean patent application No. KR 2004-0027509, filed in the Korean Patent Office on Apr. 21, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An apparatus for processing a digital signal in an image sensor, comprising:
   a line memory means for storing an inputted digital signal of red (R), green (G) and blue (B);
   a kernel generation means for generating a plurality of kernels after receiving the RGB digital signal from the line memory means;
   a false color detection means for detecting false colors by using the plurality of kernels;
   an edge detection means for detecting edges by using the plurality of kernels;
   an interpolation means for interpolating the RGB digital signal from the line memory means;
   a color space conversion means for converting the interpolated RGB digital signal into a YCbCr signal; and
   an image enhancement means for suppressing the false colors and enhancing the edges in the YCbCr signal in response to outputs of the false color detection means and the edge detection means
   wherein the false color detection means uses a portion of the plurality of the kernels to detect the false colors and the edge detection means uses another portion of the plurality of the kernels to detect the edges.

2. The apparatus of claim 1, wherein during the generation of the plurality of kernels, R and B values of corresponding pixels are converted into a G value and then expressed as G color.

3. The apparatus of claim 2, wherein the kernel for the false color detection and the kernel for the edge detection have a shared portion.

4. The apparatus of claim 3, wherein the kernel for the edge detection has a 3×3 pixel array.

5. The apparatus of claim 1, wherein the edge detection, the false color detection and the color interpolation are carried out simultaneously.

6. The apparatus of claim 1, wherein the image enhancement means includes:
- a false color suppression unit for suppressing a false colors in a corresponding pixel in response to an output of the false color detection means; and
- an edge enhancement unit for enhancing edges by increasing brightness in edge portions of a corresponding pixel in response to an output of the edge detection means.

* * * * *